(12) United States Patent
Bensch et al.

(10) Patent No.: US 8,500,216 B2
(45) Date of Patent: Aug. 6, 2013

(54) VEHICLE PARKING BRAKE AND OPERATING METHOD

(75) Inventors: Uwe Bensch, Hannover (DE); Guy Alain Djeutchouang Djiya, Hannover (DE); Henning Förster, Nordstemmen (DE); Hartmut Rosendahl, Hannover (DE); Wolfgang Strache, Hemmingen (DE); Otmar Struwe, Hannover (DE)

(73) Assignee: WABCO GmbH, Hannover (DE)

( * ) Notice: Subject to any disclaimer, the term of this patent is extended or adjusted under 35 U.S.C. 154(b) by 330 days.

(21) Appl. No.: 12/735,528

(22) PCT Filed: Dec. 20, 2008

(86) PCT No.: PCT/EP2008/010981
§ 371 (c)(1),
(2), (4) Date: Sep. 29, 2010

(87) PCT Pub. No.: WO2009/103330
PCT Pub. Date: Aug. 27, 2009

(65) Prior Publication Data
US 2011/0012421 A1    Jan. 20, 2011

(30) Foreign Application Priority Data
Feb. 19, 2008   (DE) .......................... 10 2008 009 882

(51) Int. Cl.
B60T 8/32   (2006.01)
(52) U.S. Cl.
USPC ..................................... 303/115.2

(58) Field of Classification Search
USPC ............... 303/122, 122.01, 122.03, 122.05, 303/123, 115.1–155.2
See application file for complete search history.

(56) References Cited

U.S. PATENT DOCUMENTS

| | | | |
|---|---|---|---|
| 5,954,407 A * | 9/1999 | Schramm et al. | 303/155 |
| 6,102,492 A * | 8/2000 | Diehle et al. | 303/113.5 |
| 6,663,195 B1 * | 12/2003 | Arnold | 303/122.03 |
| 7,244,003 B2 * | 7/2007 | Larson | 303/191 |
| 7,363,138 B2 * | 4/2008 | Scelers et al. | 701/82 |
| 2005/0029859 A1 * | 2/2005 | Bensch et al. | 303/89 |
| 2006/0232126 A1 | 10/2006 | Giers et al. | |

FOREIGN PATENT DOCUMENTS

| | | |
|---|---|---|
| DE | 199 42 533 A1 | 11/2000 |
| DE | 103 36 611 A1 | 3/2005 |
| EP | 1 538 054 A2 | 6/2005 |
| FR | 2 830 826 | 4/2003 |
| FR | 2830826 A1 * | 4/2003 |
| WO | WO 2004/054862 A1 | 7/2004 |

OTHER PUBLICATIONS

Electronic translation of FR2830826A1.*

* cited by examiner

*Primary Examiner* — Anna Momper
(74) *Attorney, Agent, or Firm* — Kramer Levin Naftalis & Frankel LLP

(57) ABSTRACT

A parking brake of a brake system for a vehicle includes an anti-lock device, which, based on a signal that is dependent on the rotational speed of the vehicle engine, transmission, or drive shaft, prevents blocking or excess slippage of a wheel that can be decelerated by the parking brake.

29 Claims, 6 Drawing Sheets

VEHICLE PARKING BRAKE AND OPERATING METHOD

FIELD OF THE INVENTION

The present invention generally relates to a parking brake of a vehicle brake system.

BACKGROUND OF THE INVENTION

Brake systems comprise not only a service brake but usually also a parking brake in order to be able to shut down the vehicle with the brake engaged. Such a parking brake is also referred to as a handbrake.

Parking brakes for brake systems that are operated by pressurized media generally have spring-loaded brake cylinders in which a storage spring engages the brake so that the vehicle is braked or can no longer be moved. This parking brake is released by applying compressed air to a spring store part of a spring-loaded brake cylinder, so that the storage spring is compressed and the parking brake is therefore released.

The supply of compressed air to the spring store part in order to release the parking brake is provided by means of an air-quantity-boosting valve device, in particular a relay valve. The air-quantity-boosting valve device outputs, at its outlet, the same pressure that is present at its control inlet, but with a boosted quantity of air drawn from a compressed air reservoir.

The control inlet of the air-quantity-boosting valve device is supplied with the control pressure via at least one control valve. This control valve is embodied as an electrically actuatable control valve, wherein the switched state of this control valve is determined by an electrical control device. The control device is in turn electrically connected to an actuation device for actuating the parking brake. This actuation device can be actuated by the driver of the vehicle. The driver can release or engage the parking brake by means of this actuation device.

The spring-loaded brake cylinders usually have a spring store part and a service brake part. The service brake is conventionally actuated by means of a brake pedal, wherein the service brake generally comprises an anti-lock brake device (anti-lock brake system or ABS), which prevents wheels of the vehicle from locking owing to the actuation of the service brake.

In contrast, anti-lock brake devices of the parking brake that prevent wheels of the vehicle from locking owing to the actuation of the parking brake are less widespread. DE 199 42 533 A1 describes a parking brake with such an anti-lock brake device, wherein locking of wheels is prevented on the basis of the wheel speeds detected by sensors. This construction can be problematic in that, when the wheel speed sensors or the electronics that process the sensor signals fail, braking with anti-lock protection is no longer possible when the parking brake is actuated. Furthermore, this embodiment has the disadvantage that costs are incurred as a result of the use of wheel speed sensors and of the cables required for sensors.

SUMMARY OF THE INVENTION

Generally speaking, it is an object of the present invention to provide a cost-effective parking brake with an anti-lock brake device that functions reliably.

Advantageously, in accordance with embodiments of the present invention, the anti-lock brake device of the parking brake does not require the signals from wheel speed sensors to prevent locking or increased slip at a wheel or a plurality of wheels. The anti-lock brake device and therefore also the parking brake can therefore be implemented cost-effectively since there is no need for wheel speed sensors or the necessary cables. Furthermore, for vehicles equipped with wheel speed sensors, braking with anti-lock protection is still possible by means of the parking brake even if the signals of the wheel speed sensors or of the signal processing unit or control unit connected to these sensors experience a failure or exhibit a fault or poor quality.

Embodiments of the present invention can be used in pressure-medium-operated and in electromechanically operated parking brakes. One embodiment of a pressure-medium-operated parking brake system has an electrical control device for controlling an electrically actuatable valve device for ventilating and venting a spring store part of at least one spring-loaded brake cylinder.

The anti-lock brake device advantageously determines slip at the wheel on the basis of the signal that is dependent on the rotational speed of the engine, the transmission or the drive shaft in the vehicle. On the basis of the slip, locking of the wheel can be reliably detected and therefore prevented.

When increased slip is present, the parking brake can advantageously be at least partially released by virtue of the fact that, for example in pressure-medium-operated brake systems, the spring store part of a spring-loaded brake cylinder can be at least partially ventilated. As a result, the parking brake is released in good time before the locking of the wheel. The release or the deactivation of the parking brake is to be understood as meaning that, in the case of a pressure-medium-operated parking brake, the spring store part of a spring-loaded brake cylinder is at least partially ventilated. For electromechanical parking brakes, the release or the deactivation of the parking brake is to be understood as meaning that the brake application force is reduced electromechanically.

A further advantageous embodiment provides that, when the slip is reduced to a specific value, the parking brake can be at least partially engaged in that, for example in the case of pressure-medium-operated brake systems, the spring store part of a spring-loaded brake cylinder can be at least partially vented. When the slip is reduced in this embodiment, the parking brake is actuated to a specific value in order to achieve an optimum braking effect of the parking brake. This embodiment permits the parking brake to be operated in an optimum range of the p/slip curve. The engagement or the activation of the parking brake is to be understood as meaning that, in the case of a pressure-medium-operated parking brake, the spring store part of a spring-loaded brake cylinder is at least partially vented. For electromechanical parking brakes, the engagement or the activation of the parking brake is to be understood as meaning that the brake application force is increased electromechanically.

The anti-lock brake device advantageously forms, on the basis of the signal that is dependent on the rotational speed of the vehicle engine, transmission or drive shaft, a reference signal that represents the speed of the vehicle. The anti-lock brake device is configured to ensure that the reference signal is influenced by the signal, which is dependent on rotational speed of the engine, the transmission or the drive shaft, only to the extent that the physical laws are complied with. That is, the reference signal, which represents the speed of the vehicle, can change only to an extent permitted by the maximum deceleration. This embodiment utilizes the effect that the speed of a vehicle cannot change to any desired degree but rather is subject to physical laws. This results, for example, in the maximum deceleration for a vehicle when braking on dry concrete. This maximum deceleration can be determined by trial or simulations. This physical model can be used to prevent a situation in which, when the drive axle is locked, the reference speed follows the signal that is dependent on the rotational speed of the engine, the transmission or the drive shaft, and therefore becomes zero even though the vehicle is still moving.

The anti-lock brake device determines the slip on the basis of the current difference between the reference signal and the signal that is dependent on the rotational speed of the engine, the transmission or the drive shaft. When increased slip is present, the signal that is dependent on the rotational speed of the engine, the transmission or the drive shaft, no longer corresponds to the speed of the vehicle.

The signal that is dependent on the rotational speed of the engine, the transmission or the drive shaft is advantageously a tacho signal (TCO signal), which is present in the vehicle. This TCO signal, which is made available, for example, by an engine control unit or transmission control unit, can be read out, by the electrical control device for controlling the electrically actuatable valve device for ventilating and venting a spring store part of a spring-loaded brake cylinder, from a CAN bus present in the vehicle. There is therefore no need for an additional sensor to determine the signal that is dependent on the rotational speed of the engine, the transmission or the drive shaft.

In one advantageous embodiment of the present invention, the anti-lock brake device is implemented as a software module. The software module can, for example, be implemented in the electrical control device for controlling the electrically actuatable valve device for ventilating and venting a spring store part of a spring-loaded brake cylinder. Implementation in other control units that are present in the vehicle or distribution of the software module among a plurality of control units is also possible. Implementation as a software module permits a cost-effective and flexible embodiment of the anti-lock brake device.

Furthermore, a vehicle brake system having the parking brake according to embodiments of the invention, as well as a method for operating the brake system and a method for operating the parking brake are also contemplated.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the invention are explained in more detail on the basis of the appended drawings, in which.

DETAILED DESCRIPTION OF THE PREFERRED EMBODIMENTS

Figure 1:
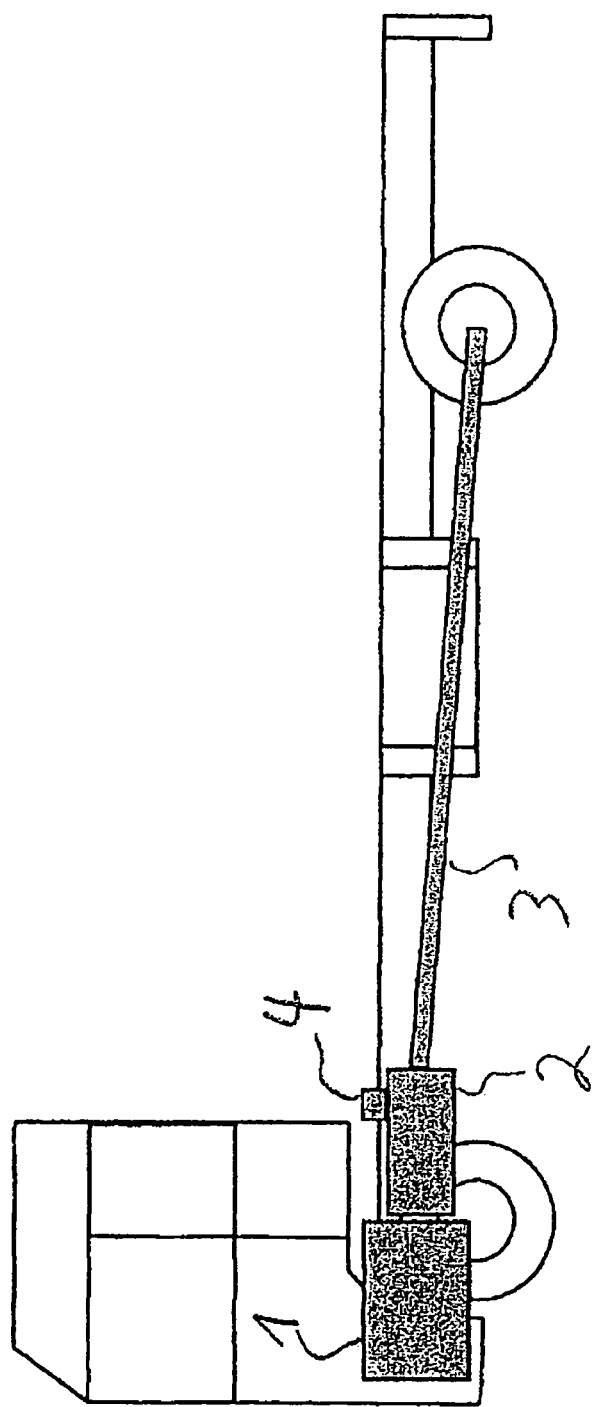
FIG. 1 is a schematic illustration of a vehicle having an engine, a transmission and a drive shaft, as well as a rotational speed sensor.

Referring now to the drawing figures, FIG. 1 is a schematic illustration of a vehicle that has an engine 1, a transmission 2 and a drive shaft 3 for driving the vehicle. In addition, a rotational speed sensor 4 is shown that senses the output speed of the transmission. On the basis of the signal of the rotational speed sensor 4, a TCO signal is calculated in a control unit (not illustrated in FIG. 1) such as, for example, an engine control unit or transmission control unit.

Figure 2:
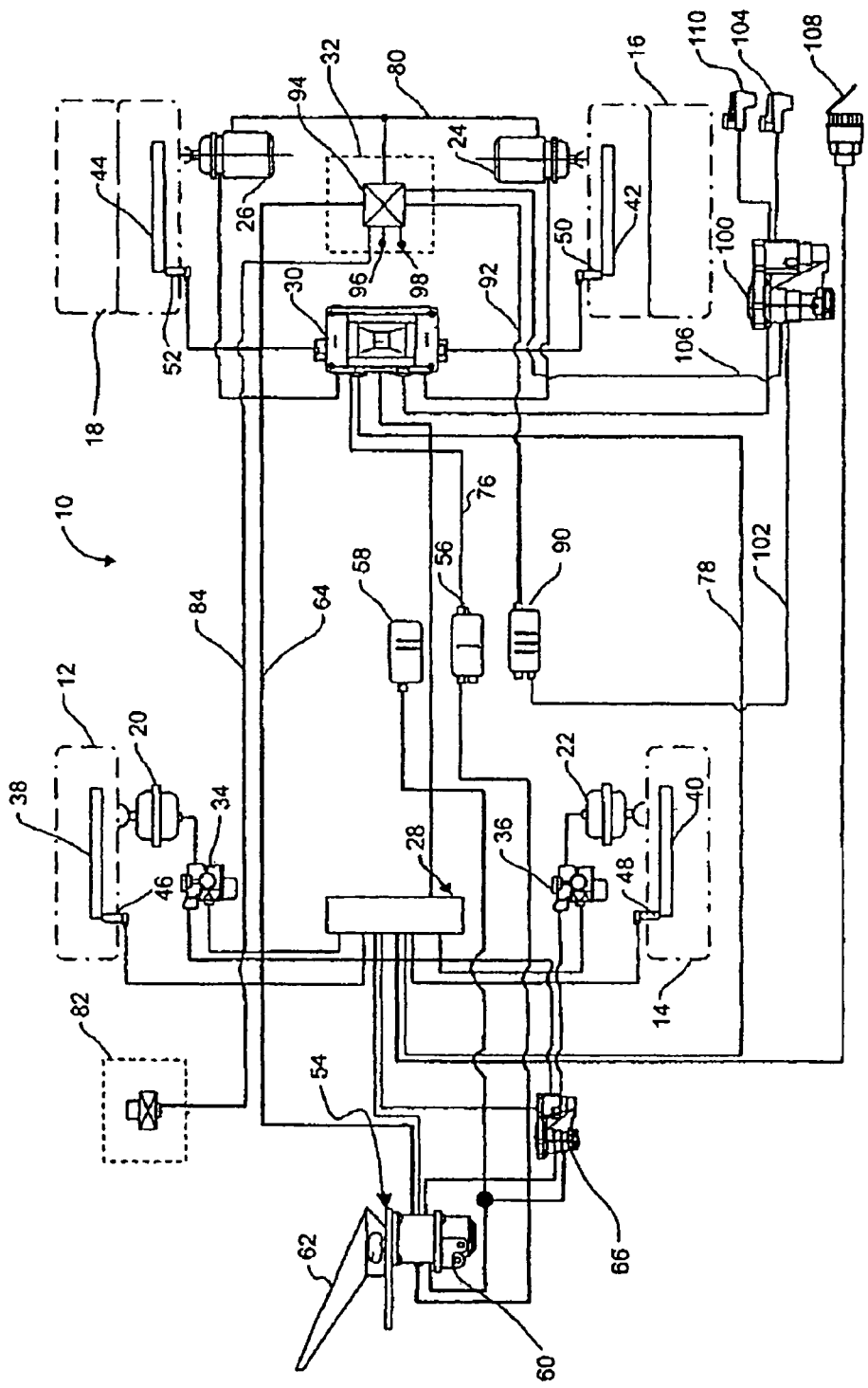
FIG. 2 is a schematic illustration of a compressed air brake system with an electropneumatic brake control device for controlling a parking brake.

FIG. 2 is a schematic illustration of a compressed air brake system 10 for a vehicle having four wheels 12, 14, 16, 18. The brake system 10 is controlled electrically, i.e., the metering of brake pressure to brake cylinders 20, 22, 24, 26 of the wheels 12, 14, 16, 18 is controlled by electrical and electronic control elements. The brake cylinders 20, 22 of the front wheels 12, 14 are controlled by a front-axle brake control module 28, and the brake cylinders 24, 26 of the rear wheels 16, 18 are controlled by a rear-axle brake control module 30. The brake cylinders 24, 26 of the rear wheels 16, 18 are embodied as spring-loaded brake cylinders 24, 26 with a service brake part and a spring store part, wherein the spring store part is controlled by an electropneumatic brake control device for controlling the parking brake, specifically a parking brake module 32. The parking brake module 32 constitutes an essential part of the parking brake of the vehicle. A number of components of the parking brake are structurally combined in a housing in the parking brake module 32.

Electromagnetically actuatable valves for influencing the brake pressure are respectively connected upstream of the brake cylinders 20, 22, 24, 26. The valves 34, 36 are used for this purpose for the front wheels 12, 14. The respective valves for the rear wheels 16, 18 are integrated into the rear-axle brake control module 30.

Sensing devices, which serve to determine the respective wheel speed, are respectively arranged on the wheels 12, 14, 16, 18. The sensing means each have a pole wheel 38, 40, 42, 44 connected in a rotationally fixed fashion to the wheel 12, 14, 16, 18 and coupled electromagnetically to an inductively operative wheel speed sensor 46, 48, 50, 52.

The brake system 10 also has a brake value generator 54 that senses a braking request of the driver. The brake value generator 54 comprises an electrical part and a pneumatic part. The pneumatic part is supplied with compressed air by a first compressed air reservoir vessel 56 and a second compressed air reservoir vessel 58. These compressed air reservoir vessels 56, 58 are used to supply compressed air to the brake cylinders 20, 22 of the front wheels 12, 14 and the brake cylinders 24, 26 of the rear wheels 16, 18, respectively. The pneumatic part of the brake value generator 54 has a brake valve 60, which is embodied in a dual circuit, is mechanically connected to a brake pedal 62 and can be actuated by means of the brake pedal 62. When the brake pedal 62 is actuated, a pressure signal is fed from the brake valve 60 to the rear-axle brake control module 30 via a compressed air line 64. A further (second) pressure signal, decoupled from this first pressure signal, is fed to a front-axle valve device 66.

The front-axle valve device 66 has a front-axle redundancy valve (not illustrated separately) and a pressure controlling valve device (not illustrated separately), for example a proportional relay valve that converts an electrical signal from the front-axle brake control module 28 into a pneumatic brake pressure.

The front-axle valve device 66 is connected to the second compressed air reservoir vessel 58 via a compressed air line. It is also connected to the front-axle brake control module 28 via an electrical line. In normal operating mode, pressure for the brake cylinders 20, 22 is modulated by means of an electrical signal that is fed via the electrical line. In what is referred to as a case of redundancy, for example when the electrical power supply for the electrical control system fails, or when the entire electrical control system of the brake system fails or individual control modules of the brake system fail, switching over occurs to the pressure signal of the brake value generator 54. Compressed air can be fed to the valves 34, 36 by means of the front-axle valve device 66.

The rear-axle brake control module 30 is connected to the first compressed air reservoir vessel 56 via a pneumatic line 76. The rear-axle brake control module 30 also has a data interface that is connected via an electrical line 78 to a further data interface of the front-axle brake control module 28. The modules 28, 30 exchange data via these data interfaces. For example, the rear-axle brake control module 30 receives, from the front-axle brake control module 28, the driver's braking request detected by means of the brake value generator 54, and controls, in a way that is analogous to the front-axle brake control module 28, the brake pressure in the brake cylinders 24, 26 of the rear wheels 16, 18 by means of valves arranged in the rear-axle brake control module 30. The rear-axle brake control module 30 obtains the compressed air required for this purpose from the first compressed air reservoir vessel 56.

The spring-loaded brake cylinders 24, 26 have a service brake part and a spring store part. The service brake part includes a diaphragm part that is pneumatically connected to the service brake system of the rear axle and to which actual brake pressure can be applied, as well as a spring store part that is pneumatically isolated from the diaphragm part and to which compressed air can be applied via separate compressed air lines. The spring store part forms part of the parking brake. The spring store part includes a spring store function that, when compressed air is applied to the spring store part, prestresses a spring store and in doing so prevents or reduces a braking effect of the spring store function, while the storage spring relaxes during the venting of the spring store part and in doing so applies a braking effect, within the scope of the spring spring-loaded function, to the brake connected to the respective spring-loaded brake cylinder 24, 26.

A parking brake function, which also permits the vehicle to be braked or secured when compressed air is absent, is implemented by means of these spring-loaded brake cylinders 24, 26. The parking brake function occurs when the respective spring store part of the spring-loaded brake cylinders 24, 26 is vented below a minimum pressure value. The spring store part of the brake cylinders 24, 26 is pneumatically connected via compressed air lines 80 to the parking brake module 32, which permits pressure to be controlled electronically.

A manually actuatable parking brake signal generator 82 is connected to the parking brake module 32 via a multiconductor electrical line 84. The electrical devices in the vehicle are supplied with electrical energy by an electrical power supply device, for example a vehicle battery (not illustrated), via corresponding electrical lines.

A third compressed air reservoir vessel 90 is connected to the parking brake module 32 via a compressed air line 92. This compressed air reservoir vessel 90 serves to supply compressed air to the parking brake circuit and to the trailer.

The parking brake module 32 also has an input connection 94 for the pressure signal that is fed via the compressed air line 64. The parking brake module 32 also has connections 96, 98 for supplying electrical energy and a data interface. The connection 96 for the data interface is used to connect to a data bus system provided in the vehicle, which is also referred to as the vehicle bus. The vehicle bus serves to exchange data between various devices that are provided in the vehicle and contain an electronic controller, these being, for example, the modules 28, 30 that are for this purpose also connected to the vehicle bus via respective data interface connections.

The vehicle described is suitable for hitching a trailer. In this context, the previously described vehicle is also referred to as a tractor vehicle and the unit composed of the tractor vehicle and trailer is also referred to as a vehicle train.

The brake system 10 also has a trailer control valve 100 that is used to control the brake pressure of a trailer that can be hitched. The trailer control valve 100 is connected to the third compressed air reservoir vessel 90 via a compressed air line 102 in order to supply compressed air. The trailer control valve 100 outputs the compressed air, drawn from the compressed air reservoir vessel 90, to the brake system of a hitched trailer in a stepped manner via a compressed air connection 104 as a function of electrical and pneumatic control signals. In order to control this outputting of pressure, the trailer control valve 100 has an electrical signal input connected to the rear-axle brake control module 30 and via which the trailer control valve 100 receives an electrical signal that reflects the braking request of the driver. Alternatively, the electrical signal input can also be connected to the front-axle brake control module 28. In addition, a pressure control inlet for receiving pneumatic control signals is provided. The pressure control inlet is connected to the parking brake module 32 via a compressed air line 106.

An electrical plug-type connection 108 serves to supply power and transmit data signals to the trailer. In addition, a compressed air supply connection 110 is provided for supplying the trailer with supply pressure.

The brake system 10 also has a compressed air supply system (not illustrated), for example a compressor that is driven by the vehicle engine 1, by means of which the compressed air reservoir vessels 56, 58, 90 can be filled with compressed air.

Figure 3:
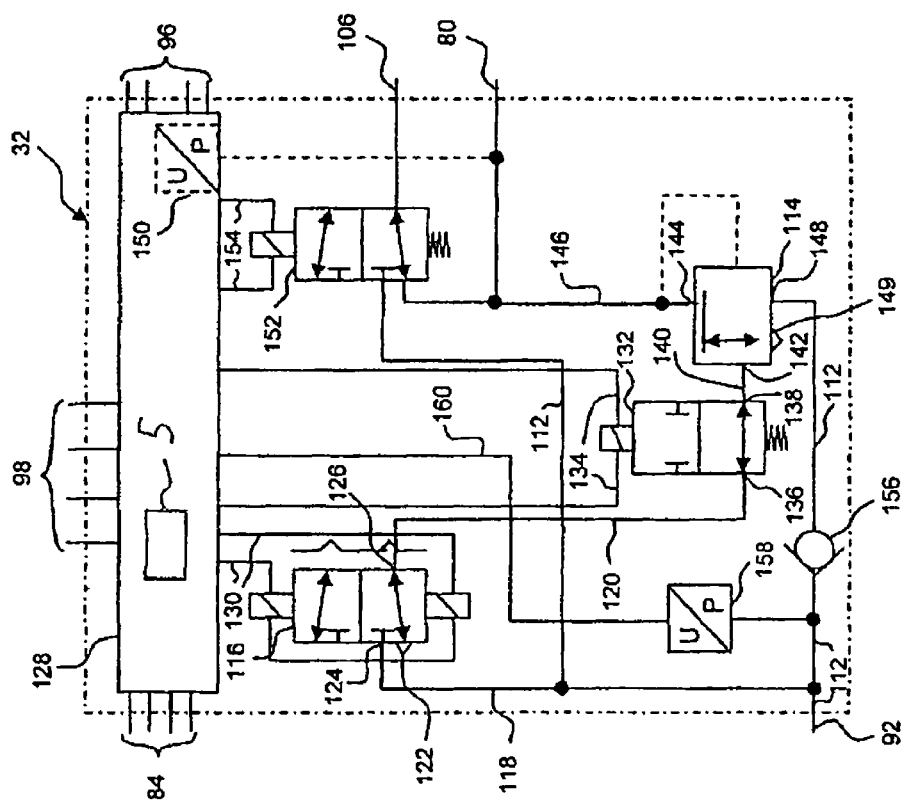
FIG. 3 shows an electropneumatic brake control device for controlling the parking brake.

FIG. 3 shows the construction of the parking brake module 32 in schematic form. The compressed air line 92 is connected to a compressed air feed line 112 by means of which compressed air is fed to an air-quantity-boosting valve device, which is embodied as a relay valve 114. The parking brake control module 32 is therefore supplied with compressed air from the third compressed air reservoir vessel 90. A bistable valve 116 is connected to the compressed air feed line 112 via a compressed air line 118. The bistable valve 116 is embodied as an electromagnetically actuatable valve, in particular as a 3/2-way valve. It has a first switched position, also referred to as a parked position or venting position, as illustrated in FIG. 3. In this position, an output-side outlet 126 connected to a compressed air line 120 is connected to a venting connection 122, which is indirectly or directly connected to the atmosphere.

In a second switched position, referred to below as the pressure feed position or driving position, the bistable valve 116 connects a pressure present at its inlet 124 via the compressed air line 118 in an unmodified form to the outlet 126 or the compressed air line 120. This second switched position is adjusted in the fault-free driving mode of the brake system. However, in the fault-free parked state of the vehicle, the first switched position is selected so that the compressed air line 120 is vented.

The positions of the bistable valve 116 are switched via an electrical control unit 128 of the parking brake control module 32. The electrical control unit 128 is electrically connected for this purpose to the bistable valve 116 via electrical lines 130. If, for example, the parking brake signal generator 82 is actuated, the electrical control unit 128 causes the bistable valve 116 to switch into its parked position by outputting a corresponding electrical signal. However, in a corresponding way, the electrical control unit 128 can also cause the bistable valve 116 to switch into its driving position.

The outlet 126 of the bistable valve 116 is connected via the compressed air line 120 to what is referred to as a holding valve 132. The latter is embodied as a solenoid valve connected in turn to the electrical control unit 128 via electrical lines 134. This valve can therefore be actuated electromagnetically via the electronic control unit 128. Valve 132 is embodied as a 2/2-way valve. In its switched position illustrated in FIG. 3, it permits compressed air to flow through from the compressed air line 120, which is connected to an inlet 136 of the holding valve 132, to an outlet 138 of the holding valve, which is connected to a control inlet 142 of the relay valve 114 via a further compressed air line 140.

In the second switched position, which is not illustrated in FIG. 3, the holding valve 132 shuts off the compressed air flow. In order to achieve a metered flow of compressed air, the valve 132 can be activated by the electrical control unit 128 using, for example, a clocked signal via the electrical lines 134. In this way, a predefined pressure can be applied to the control inlet 142 of the relay valve 114.

The valve 132 can also be embodied as a proportional valve, i.e. proportional or at least quasi-proportional passage cross sections can be set between the extreme values of the open position and the closed position by activating the electromagnet of the valve with suitable electrical signals, for example clocked signals.

The relay valve 114 outputs, at its outlet 144, an outlet pressure into a compressed air line 146 that corresponds to the pressure applied to the control inlet 142 of the relay valve 114 via the compressed air line 140, and therefore applied to a control chamber of the relay valve 114, wherein the relay valve 114 draws the compressed air necessary for this from the compressed air feed line 112, which is connected to an net 148 of the relay valve 114. Any venting of the compressed air line 146 that may be necessary takes place via a venting outlet 149, connected indirectly or directly to the atmosphere, of the relay valve 114.

On the output side of the relay valve 114, a pressure sensor 150 is optionally arranged on the compressed air line 146, which pressure sensor 150 outputs an electrical signal, corresponding to the pressure in the compressed air line 146, to the electrical control device 128 and is evaluated there as an actual pressure value.

The compressed air line 146 is connected to the compressed air line 80 leading to the spring store parts of the spring-loaded brake cylinders 24, 26.

The compressed air line 146 is also connected to what is referred to as a trailer control valve 152. This valve is embodied as a 3/2-way valve. By means of this valve it is possible to activate what is referred to as a trailer control function. The term trailer control function denotes a state of the brake system 10 in which, when the parking brake function has been applied, the brakes of a trailer connected to the tractor vehicle are released in order to provide the driver of the tractor with the possibility of checking whether, when the vehicle train is parked, the braking effect of the parking brake of the tractor alone is sufficient to prevent the entire vehicle train from rolling away. Such checking is necessary, in particular, in the case of trailers in which the brakes of the trailer could be released owing, for example, to a gradual pressure loss when the vehicle is parked for a relatively long time. It is also necessary to ensure in this case that the vehicle train does not roll away, and this accordingly has to be brought about by the parking brake of the tractor vehicle.

The trailer control valve 152 is connected to the electrical control unit 128 for the purpose of actuation via the electrical line 154. In a first switched position (illustrated in FIG. 3), the trailer control valve 152 connects the pressure line 106 leading to the trailer control valve 100 to the compressed air line 146. In its second switched position, the trailer control valve 152 connects the compressed air line 106 to the compressed air feed line 112 or the compressed air line 92 and therefore to the compressed air supply of the third compressed air reservoir vessel 90. In this second switched position, the trailer control function is activated. In this case, supply pressure is applied to the pressure control inlet, connected to the compressed air line 106, of the trailer control valve 100, which causes the brakes of the trailer to be released due to an inverting function of the trailer control valve 100.

In conventional systems, a non-return valve is located in the compressed air line 92, i.e., outside the parking brake module 32, which non-return valve prevents the spring stores of the brake cylinders 24, 26 from being vented in the case of veering off of the trailer or a leakage in the parking brake circuit. Such venting would in fact cause the parking brake to be applied, which in the case of veering off of the trailer would bring about dangerous emergency braking of the tractor vehicle.

In the exemplary embodiment of the parking brake module 32 illustrated in FIG. 3, the non-return valve 156 is, in contrast, located in the compressed air feed line 112, i.e., between the connection of the compressed air line 92 to the parking brake module 32 and the inlet 148 of the relay valve 114. The relay valve 114 closes if the pressure at the inlet 148 of the relay valve 114 is greater than the pressure in the pressure line 92. In the opposite case, i.e., when the pressure in the pressure line 92 is greater than at the inlet 148 of the relay valve 114, the non-return valve 156 opens so that the pressure or compressed air can pass unimpeded in this direction.

The relay valve is in addition arranged such that the junction in the compressed air feed line 112 to the compressed air line 118 to the bistable valve 116 lies before the non-return valve 156, i.e., between the non-return valve 156 and the connection of the compressed air line 92 to the parking brake module 32. As a result of this arrangement of the non-return valve 156, the control pressure present at the control inlet 142 of the relay valve 114 can be connected to the third compressed air reservoir vessel 90 via the holding valve 132, and the bistable valve 116, which is in the driving position, can be connected to the third compressed air reservoir vessel 90 via the compressed air lines 140, 120 and 118 as well as via the compressed air line 92 in the event of an unplanned failure of the electrical energy supply. Repeated actuation of the service brake when the electrical energy supply has failed initially causes the pressure in the first and second reservoir vessels 56, 58 and therefore also in the third reservoir vessel 90 to drop since they communicate with one another. However, a pressure drop in the third reservoir vessel 90 leads to a pressure drop in the control chamber of the relay valve 114 owing to the open position of the valves 116 and 132 and therefore of the compressed air lines 92, 118, 120 and 140, which are connected to one another. This leads in turn to a pressure drop in the pressure line 146 and therefore also in the compressed air line 80, and consequently to venting of the spring store part of the spring-loaded brake cylinders. The spring stores are therefore activated so that the parking brake is engaged.

In addition, an additional pressure sensor 158 is advantageously connected into the compressed air feed line 112, specifically between the non-return valve 156 and the connection of the compressed air line 92 to the parking brake control module 32. This pressure sensor generates an electrical signal that corresponds to the pressure in the compressed air feed line 112 before the non-return valve 156 and is output to the electrical control unit 128 via an electrical line 160. If, in the normal operating mode, the measured pressure drops below a critical pressure, the holding valve 132 is energized or switched so that the control pressure in the control space of the relay valve 114 is shut in. This makes it possible to prevent unintentional application of the spring-loaded brakes in the normal operating mode. An example of an unplanned pressure drop, which is measured by the pressure sensor 158, is, for example, use of the anti-lock system, which leads to a pressure drop in the brake circuits.

The electrical control unit 128 comprises an anti-lock brake device 5 for preventing locking of the parking brake. According to embodiments of the invention there is provision that the anti-lock brake device 5 prevents locking or excessively increased slip at a wheel 16, 18, which can be braked by means of the spring-loaded brake cylinders 24, 26, on the basis of a signal that is dependent on a rotational speed of an engine 1, a transmission 2 or a drive shaft 3 present in the vehicle. Increased slip is to be understood as slip that exceeds a predefined limiting value. Advantageously, the anti-lock brake device 5 of the parking brake does not require the signals of wheel speed sensors 46, 48, 52, 50 for preventing locking or increased slip at a wheel 16, 18. The signal that is dependent on rotational speed of engine 1, transmission 2 or drive shaft 3 is used exclusively by the anti-lock brake device for preventing locking or increased slip at wheel 16, 18. The signal may be a TCO signal, which is present in the vehicle and which is generated, for example, by the sensor 4 that detects the transmission output rotational speed. The TCO signal is transmitted via a bus system to the electrical control device 128 of the parking brake by a transmission control unit or engine control unit connected to the sensor 4 and the TCO signal is available there to the anti-lock brake device 5 for preventing locking or increased slip at wheel 16, 18.

The anti-lock brake device 5, and therefore also the parking brake, can therefore be implemented cost-effectively since no wheel speed sensors 46, 48, 52, 50 or the necessary cables are required. Furthermore, for vehicles equipped with wheel speed sensors 46, 48, 52, 50, braking with anti-lock protection is advantageously possible by means of the parking brake even in the event of a failure, a fault or poor quality of the signals of the wheel speed sensors 46, 48, 50, 52 or of the signal processing unit or control unit connected to these sensors.

The anti-lock brake device 5 prevents locking or increased slip at wheel 16, 18 by determining, on the basis of the TCO signal, the slip at the wheel 16, 18 and releasing the parking brake as a function of the slip or ventilating the spring store part of the spring-loaded brake cylinders 24, 26.

Figure 4:
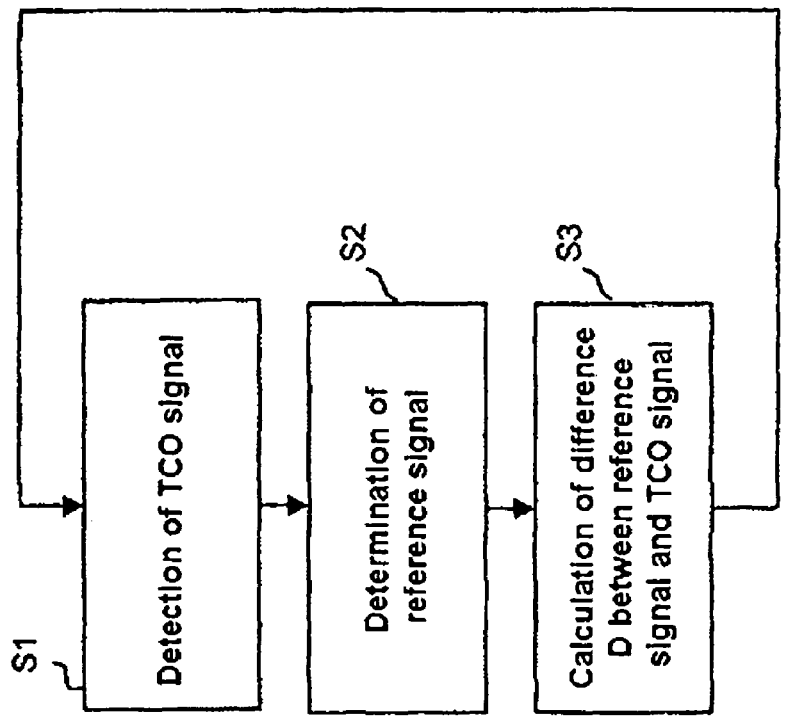
FIG. 4 shows a method for determining the slip at a wheel.

FIG. 4 illustrates a method for determining the slip. In step S1, the current TCO signal (TCO signal) is detected by the anti-lock brake device 5. In step S2, a reference signal is determined on the basis of the TCO signal. This reference signal is dependent not only on the TCO signal but also on the maximum possible deceleration of the vehicle. Use is made of the effect according to which the speed of a vehicle cannot change to any desired degree but rather is subject to physical laws. This results, for example, in the maximum deceleration for a vehicle when braking on dry concrete. This maximum deceleration can be determined by trial or simulations. If increased slip is present, the TCO signal no longer corresponds to the speed of the vehicle. The anti-lock brake device 5 is configured to ensure that the reference signal is influenced by the TCO signal only to the extent that the physical laws are complied with. That is, the reference signal, which represents the speed of the vehicle, can change only to a degree permitted by the maximum deceleration. In step S3, the difference D between the reference signal and the TCO signal is calculated. This difference D corresponds to the slip of wheel 16, 18. From step S3, the system branches to step S1, i.e., the anti-lock brake device 5 continuously determines the slip of wheel 16, 18.

Figure 5:
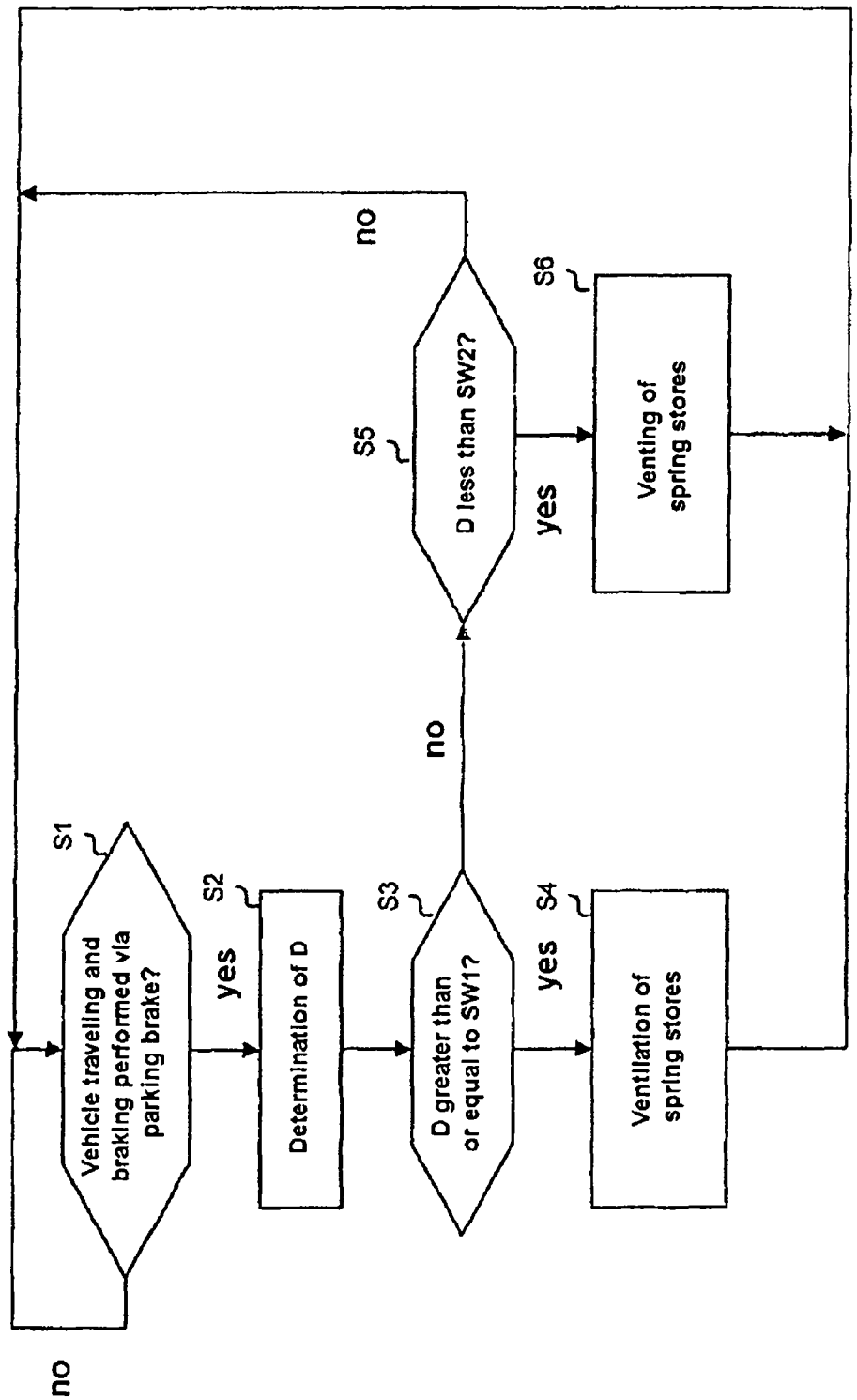
FIG. 5 shows a method for operating a parking brake with anti-lock protection.

FIG. 5 illustrates a method for operating the parking brake with anti-lock protection. In step S1, the anti-lock brake device 5 tests whether the vehicle is traveling and whether a braking process of the parking brake is present. If the condition in S1 is met, in step S2 the current value of the difference D between the reference signal and the TCO signal is determined in accordance with the method of FIG. 4. Otherwise, branching to S3 occurs. In step S3, a test is conducted to determine whether D, that is, the slip at wheel 16, 18, which is braked by the parking brake, is greater than or equal to a predetermined threshold value. That is, a test is conducted to determine whether increased slip is present. If this condition is met, in step S4 the spring store parts of the spring-loaded brake cylinders 24, 26 are ventilated by the electrically actuatable valve device 114, 116, 132. If not, in step S5 a test is conducted to determine whether D is smaller than a predetermined threshold value SW2. If this condition is met, in step S6 the spring store parts of the spring-loaded brake cylinders 24, 26 are at least partially vented by the electrically actuatable valve device 114, 116, 132. Otherwise, branching to step S1 takes place. The method illustrated in FIG. 5 runs continuously in the anti-lock brake device 5; from steps S4 and S6 branching to S1 occurs. The method ensures that an optimum braking effect of the parking brake is achieved with simultaneous controllability of the vehicle, since the parking brake is operated in the optimum range of the p/slip curve.

Figure 6:
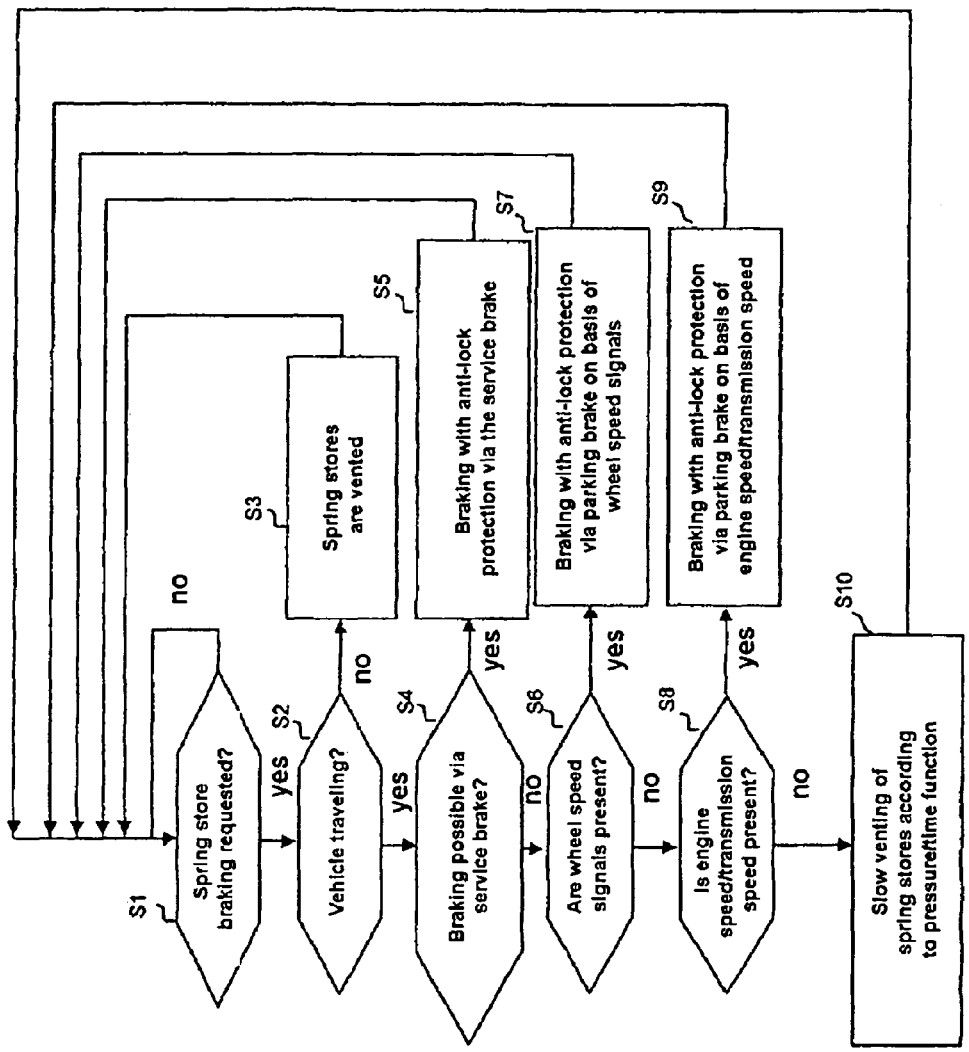
FIG. 6 shows a method for operating a brake system of a vehicle with antilock protection.

FIG. 6 shows a method for operating the brake system of the vehicle with anti-lock protection. In step S1 it is tested whether there is a request for the actuation of the parking brake. This request for the actuation of the parking brake can be generated by the parking brake signal generator 82 or by a braking request signal of the service brake. The brake request signal of the service brake is generated by the module 30 when the service brake fails and is transferred to the electrical control device 128 of the parking brake. Further details about the braking request of the service brake can be found in DE 103 36 611 A1, in particular paragraph [0088]. If the condition specified in S1 is met, in step S2 it is tested whether the vehicle is traveling. If not, step S1 is carried out again.

If the condition of step S2 is not met, in step S3 the parking brake is engaged by venting the spring store parts of the spring-loaded brake cylinders 24, 26 by means of the electrically actuatable valve device 114, 116, 132. After step S3, step S1 is carried out again. If the condition in step S2 is met, in step S4 a test is conducted to determine whether braking is possible by means of the service brake. If this condition is met, in step S5 braking with anti-lock protection is carried out by means of the service brake, and step S1 is then carried out again. Otherwise, in step S6 a test is conducted to determine whether wheel speed signals are present. If this condition is met, braking with anti-lock protection is carried out in step S7 by means of the parking brake on the basis of the wheel speed signals, and step S1 is then carried out again.

Otherwise, in step S8 a test is conducted to determine whether a signal that is dependent on rotational speed of engine 1, transmission 2 or drive shaft 3 is present. If this is the case, in step S9 braking with anti-lock protection is carried out by means of the parking brake on the basis of the signal that is dependent on rotational speed of engine 1, transmission 2 or drive shaft 3. Step S1 is then carried out again.

Otherwise, in step S10 the parking brake is slowly activated in accordance with a pressure/time function by slowly venting the spring store parts of the spring-loaded brake cylinders 24, 26 in accordance with a pressure/time function, in particular in accordance with a ramp function, by means of the electrically actuatable valve device 114, 116, 132. The method ensures optimum braking of the vehicle as a function of the state of the brake system of the vehicle. When the vehicle is traveling and when the service brake system is intact, braking with anti-lock protection is therefore carried out using the service brake system (S5). When the service brake system is not intact, the braking with anti-lock protection is carried out by means of the parking brake on the basis of the wheel speed signals (S7) or—if the latter are not present—on the basis of the signal that is dependent on rotational speed of engine 1, transmission 2 or drive shaft 3 (S9). If neither wheel speed signals nor the signal that is dependent on rotational speed of engine 1, transmission 2 or drive shaft 3 are present, the spring store parts are slowly vented in order to brake the vehicle in a controlled and non-abrupt fashion.

The methods presented here are preferably executed in the electrical control unit 128 of the parking brake. However, it is also conceivable to allow the methods or parts of the methods to be carried out in other control units such as, for example, the module 28 or in the control unit of an electrical air conditioning system.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A parking brake of a brake system for a vehicle, comprising an anti-lock brake device configured to prevent at least one of locking and excessively increased slip at a wheel of the vehicle that can be braked by the parking brake based on (i) a first signal that is dependent on rotational speed of at least one of an engine, a transmission and a drive shaft of the vehicle and (ii) a reference signal that is based at least in part on a maximum deceleration of the vehicle and the first signal and (iii) a difference between the reference signal and the first signal.

2. The parking brake as claimed in claim 1, further comprising an electrical control device configured to control an electrically actuatable valve device for ventilating and venting a spring store part of at least one spring-loaded brake cylinder.

3. The parking brake as claimed in claim 1, wherein the anti-lock brake device is configured to determine slip at the wheel based on the first signal.

4. The parking brake as claimed in claim 3, wherein the parking brake is at least partially releasable when the wheel exhibits increased slip.

5. The parking brake as claimed in claim 4, wherein the parking brake is at least partially engageable when slip at the wheel is reduced to a preselected value.

6. The parking brake as claimed in claim 1, wherein the anti-lock brake device is configured to determine the slip at the wheel based on the difference.

7. The parking brake as claimed in claim 1, wherein the first signal is a tacho signal.

8. The parking brake as claimed in claim 1, wherein the anti-lock brake device comprises a software module.

9. The parking brake as claimed in claim 1, wherein the first signal is generated by a rotational speed sensor.

10. A brake system of a vehicle having a parking brake as claimed in claim 1.

11. A method for operating a brake system of a vehicle having a parking brake according to claim 1 and a service brake, the method comprising the step of generating a request for actuation of the parking brake by one of actuating a parking brake signal generator associated with the parking brake and using a brake request signal of the service brake.

12. The method as claimed in claim 11, further comprising the step of determining whether the vehicle is traveling.

13. The method as claimed in claim 12, further comprising the step of engaging the parking brake when the vehicle is stationary.

14. The method as claimed in claim 12, further comprising the step of determining whether braking with anti-lock protection is possible using the service brake when the vehicle is traveling.

15. The method as claimed in claim 14, further comprising the step of effecting braking with anti-lock protection using the service brake.

16. The method as claimed in claim 14, further comprising the step of determining whether a wheel speed signal of at least one vehicle wheel is present when braking using the service brake is not possible.

17. The method as claimed in claim 16, further comprising the step of effecting braking with anti-lock protection based on the wheel speed signal using the parking brake when the wheel speed signal is present.

18. The method as claimed in claim 16, further comprising the step of determining whether a first signal that is dependent on rotational speed of at least one of an engine, a transmission and a drive shaft of the vehicle is present when the wheel speed signal is not present.

19. The method as claimed in claim 18, further comprising the step of effecting braking with anti-lock protection using the parking brake based on the first signal.

20. The method as claimed in claim 18, further comprising the step of actuating the parking brake in accordance with a pressure/time function when the first signal is not present.

21. The method as claimed in claim 20, wherein the pressure/time function is a ramp function.

22. A method for operating a parking brake of a brake system for a vehicle, comprising the step of preventing at least one of locking and excessively increased slip at a wheel of the vehicle that can be braked by the parking brake based on (i) a first signal that is dependent on rotational speed of at least one of an engine, a transmission and a drive shaft of the vehicle and (ii) a reference signal that is based at least in part on a maximum deceleration of the vehicle and the first signal and (iii) a difference between the reference signal and the first signal.

23. The method as claimed in claim 22, further comprising the step of at least one of ventilating and venting a spring store part of at least one spring-loaded brake cylinder using an electrical control device configured to control an electrically actuatable valve device.

24. The method as claimed in claim 22, further comprising the step of determining slip at the wheel based on the first signal.

25. The method as claimed in claim 24, further comprising the step of at least partially releasing the parking brake when increased slip is present.

26. The method as claimed in claim 25, further comprising the step of at least partially engaging the parking brake when the slip is reduced by a preselected value.

27. The method as claimed in claim 22, further comprising the step of determining the slip based on the difference.

28. The method as claimed in claim 22, further comprising the step of using a tacho signal as the first signal.

29. The method as claimed in claim 22, further comprising the step of generating the first signal using a rotational speed sensor.

\* \* \* \* \*

UNITED STATES PATENT AND TRADEMARK OFFICE
CERTIFICATE OF CORRECTION

PATENT NO. : 8,500,216 B2  Page 1 of 1
APPLICATION NO. : 12/735528
DATED : August 6, 2013
INVENTOR(S) : Bensch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this
Fifteenth Day of September, 2015

Michelle K. Lee
*Director of the United States Patent and Trademark Office*